INVENTORS
Tino Celio
François Guillaume

BY Pierre, Scheffler & Parker
ATTORNEYS

United States Patent Office 3,454,343
Patented July 8, 1969

3,454,343
OPTICAL ARRANGEMENT FOR LIGHTING AND FOCUSSING
Tino Celio, Buchs, and Francois Guillaume, Fribourg, Switzerland, assignors to Gretag Aktiengesellschaft, Regensdorf, Switzerland
Filed Aug. 25, 1964, Ser. No. 391,926
Claims priority, application Switzerland, Aug. 30, 1963, 10,797/63
Int. Cl. G01n 21/48
U.S. Cl. 356—210                 3 Claims

ABSTRACT OF THE DISCLOSURE

An arrangement for lighting and focussing in appliances for gauging the reflecting properties of specimens for inspection, particularly for densitometric inspection, wherein a light source is adapted to provide two light rays, means being provided for directing said two rays at an angle of substantially 45° onto the same point of a plane, in which a specimen is to be mounted, said two rays lying in planes perpendicular to each other and to the specimen plane, and wherein means are provided for focussing the scattered light reflected perpendicularly to the specimen plane.

---

Figure 1:
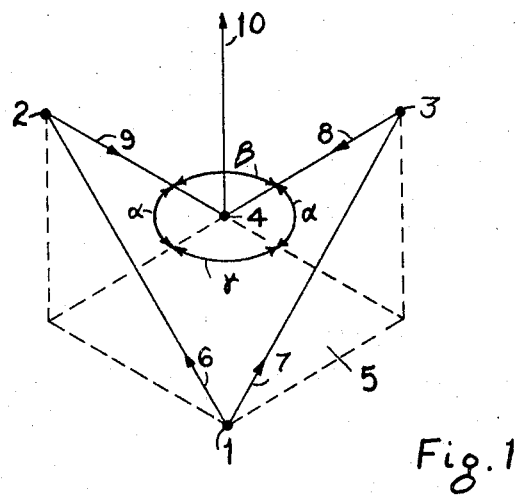

This invention relates to an optical arrangement for lighting and focussing in appliances for measuring the reflecting properties of specimens for inspection, especially for densitometric inspection.

It is customary, particularly in the photographic and printing industries, to define the blackness or colour quality of inspected specimens by stating the black-and-white or colour reflection densities. Due to the variation in scattering character of the specimens, these measurements depend to a great extent on the way in which specimens are lit and also on the way in which the scattered reflected light is collected. A standard arrangement is one which corresponds as closely as possible to the conditions encountered in observing an inspection image, namely: lighting at an angle of 45°, focussing at 90° (in relation to the measuring plane), or the other way round.

Different optical arrangements are known according with this stated standard.

The simplest arrangements of this kind comprise only one light beam and one focussing device. Such devices, however, while simple in an optical and mechanical sense, are of small intensity and are sensitive to directed unevennesses of the specimen (for example calendering).

Arrangements have been proposed which make use of an annular mirror for the (lighting or focussing) beam at 45°, thereby improving the light yield and eliminating the influence of the directed unevennesses. An annular mirror, however, is a comparatively expensive component.

An arrangement has also been proposed in which the illumination is effected vertically onto the specimen and the reflected light is collected at 45° in two directions at right-angles to one another.

This arrangement, which in itself is advantageous, is however sensitive, as regards the specimen, to the incidence of scattered light in the mirror-image direction with respect to the light focus. In consequence, the observation apertures provided for users of the apparatus, which for constructive reasons are placed in the said mirro-image direction, have to be made very small. This is a disadvantage to be found in all systems operating with a light focus of 45°.

The arrangements hitherto proposed have a further disadvantage in that they can only be made with a comparatively great structural height.

According to the present invention there is provided an arrangement for lighting and focussing in appliances for gauging the reflecting properties of specimens for inspection, particularly for densitometric inspection, wherein a light source is adapted to provide two light rays, means being provided for directing said two rays at an angle of substantially 45° onto the same point of a plane, in which a specimen is to be mounted, said two rays lying in planes perpendicular to each other and to the specimen plane, and wherein means are provided for focussing the scattered light reflected perpendicularly to the specimen plane.

According to a further feature of the invention, the arrangement is such that the light source is arranged on the illumination side at a short distance from the specimen plane, the two rays being derived from said light source by means of corresponding lenses, each ray being bent into one of said two perpendicular planes by means of a respective mirror.

By using two beams, the illumination density in the measuring spot is about doubled by comparison with arrangements using only one beam. The measuring spot produced by the present arrangement has the shape of two ellipses projected onto one another (measuring plane/light cone section), the major axes of these ellipses being substantially perpendicular to one another. This form of measuring spot is very strongly influenced visually by displacements of the specimen from the measuring plane of the apparatus, a fact which makes it easier to assess the correct optical adjustment of the densitometer to the specimen inspected. Owing to the reciprocally perpendicular position of the beams, the influence of directed irregularities in the specimen is to a large extent eliminated. Furthermore, the arrangement can be realised by means of a photo-optical device which lies in its totality on one side of the measuring spot, leaving a very ample solid angle free for visual observation. In consequence of the perpendicular focussing direction, with respect to the measuring plane, of the reflected light, the influence of scattered light falling at most from the solid observation angle is substantially excluded. Furthermore, the present arrangement may have a considerably reduced structural height as compared with previously proposed arrangements.

In accordance with a preferred embodiment of the present arrangement, cold mirrors are used for directing the light beams. The use of these mirrors obviates the interference of the infra-red fraction of the light source and thereby prevents erroneous measurements for being made.

Figure 2:
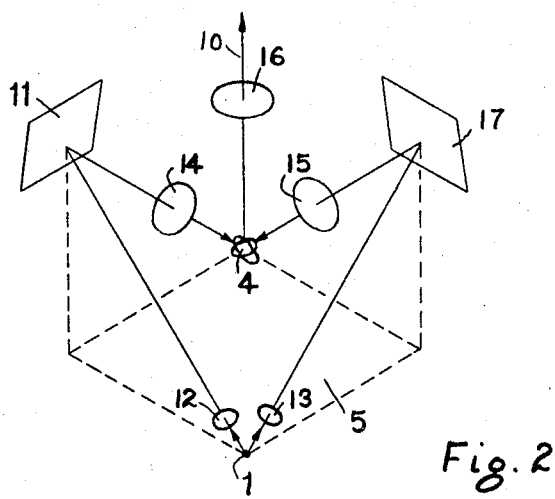

In order to enable the invention to be more readily understood, reference will now be made to the accompanying drawings, which illustrate diagrammatically and by way of example an embodiment thereof, and in which:

FIGURE 1 depicts in diagrammatic form the path of rays in an arrangement according to the present invention, and FIGURE 2 illustrates a preferred practical embodiment of the arrangement.

Referring now to FIGURE 1, there is shown a specimen plane 5, in or near which is arranged a light source 1 from which two light rays 6 and 7 are derived. These rays are turned round at points 2 and 3 in the directions 8 and 9, respectively. The angle of incidence α of each of the rays 8 and 9 with respect to the specimen plane 5 is 45° and the angle β between the rays 8 and 9 is then 60°. This effect is achieved by making the angle γ between the projections of the rays 8 and 9 on the measuring plane 5 90°. The point at which the rays 8 and 9 meet the measuring plane 5 is the measuring spot 4. The scattered light reflected from the specimen in the direction 10 which extends perpendicular to the plane 5 at the point 4 is focused in the direction 10.

FIGURE 2 shows the construction of a preferred arrangement in which a light source 1 is imaged in the pupils of lenses 14 and 15, respectively, through the medium of lenses 12 and 13, respectively, and through cold mirrors 11 and 17, respectively. The lenses 14 and 15 image the pupils of lenses 12 and 13 onto the measuring plane 5. The scattered light reflected perpendicularly from the plane 5 is focused by means of a lens 16 lying in the path 10 of the rays.

What is claimed is:

1. In an appliance for gauging the reflecting properties of a specimen to be inspected, an arrangement for lighting and focussing on the specimen comprising a light source adapted to provide two light rays, means for directing said two rays at an angle of substantially 45° onto the same point of a plane in which the specimen to be inspected is to be mounted so that said two rays lie in planes perpendicular to each other and to the specimen plane, and means for focussing scattered light reflected perpendicularly from said point of the specimen plane.

2. The arrangement defined in claim 1 wherein said light source is arranged on the illumination side at a short distance from the specimen plane, the two rays being derived from said light source by means of corresponding lenses, each ray being bent into one of said two perpendicular planes by means of a respective mirror.

3. In an appliance gauging the reflecting properties of a specimen for inspection, an arrangement for lighting the specimen and focussing light reflected therefrom, said arrangement comprising a light source adapted to provide two light rays, a system of lenses and mirrors for each light ray arranged to direct the two rays at an angle of substantially 45° on to the same point on a plane in which the specimen to be inspected is to be mounted, so that said two rays lie in planes perpendicular to each other and to the specimen plane, and lens means for focussing scattered light reflected perpendicular from said point of the specimen plane.

References Cited

UNITED STATES PATENTS

| | | |
|---|---|---|
| 2,797,334 | 6/1957 | Sweet. |
| 2,852,980 | 9/1958 | Schroder _____ 350—1 |
| 3,325,666 | 6/1967 | Bird et al. |
| 3,292,848 | 12/1966 | Clay. |
| 3,186,296 | 6/1965 | Erban. |
| 2,755,702 | 7/1956 | Cook. |
| 1,812,294 | 6/1931 | Hohn. |

RONALD L. WIBERT, *Primary Examiner.*

W. A. SKLAR, *Assistant Examiner.*

U.S. Cl. X.R.

350—91, 202, 235